(12) United States Patent
Zhou et al.

(10) Patent No.: US 10,936,387 B2
(45) Date of Patent: *Mar. 2, 2021

(54) METHOD AND APPARATUS FOR FAILURE DETECTION IN STORAGE SYSTEM

(71) Applicant: International Business Machines Corporation, Armonk, NY (US)

(72) Inventors: Xue Qiang Zhou, Shanghai (CN); Jing Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,586

(22) Filed: Jun. 4, 2019

(65) Prior Publication Data

US 2019/0286503 A1  Sep. 19, 2019

Related U.S. Application Data

(63) Continuation of application No. 15/689,902, filed on Aug. 29, 2017, now Pat. No. 10,394,632, which is a
(Continued)

(30) Foreign Application Priority Data

Dec. 11, 2014 (CN) .......................... 201410770650.4

(51) Int. Cl.
*G06F 11/00* (2006.01)
*G06F 11/07* (2006.01)

(52) U.S. Cl.
CPC .......... *G06F 11/008* (2013.01); *G06F 11/076* (2013.01); *G06F 11/0727* (2013.01)

(58) Field of Classification Search
CPC ... G06F 11/008; G06F 11/0727; G06F 11/076
See application file for complete search history.

(56) References Cited

U.S. PATENT DOCUMENTS

| 7,058,844 B2 | 6/2006 | Wiley et al. |
| 7,076,573 B2 | 7/2006 | Allen et al. |

(Continued)

FOREIGN PATENT DOCUMENTS

| CN | 101354633 A | 1/2009 |
| CN | 102316303 B | 1/2012 |

(Continued)

OTHER PUBLICATIONS

CN Application 201410770650.4, entitled "Method and Apparatus for Failure Detection in Storage System," Filed Dec. 11, 2014.
(Continued)

*Primary Examiner* — Joseph R Kudirka
(74) *Attorney, Agent, or Firm* — Jared L. Montanaro

(57) ABSTRACT

The present disclosure relates to a method and an apparatus for failure detection in a storage system. One embodiment provides a method for failure detection in a storage system. The method includes determining an amount of data received by a plurality of switches in the storage system within a predetermined time window so as to obtain a plurality of data amounts; determining a count of check errors detected by the plurality of switches in the data to obtain a plurality of check error counts; and calculating a failure risk for the plurality of switches based on the plurality of data amounts and the plurality of check error counts. Another embodiment of the present invention provides a corresponding apparatus.

20 Claims, 7 Drawing Sheets

Related U.S. Application Data continuation of application No. 14/919,339, filed on Oct. 21, 2015, now Pat. No. 9,760,419.

(56) References Cited

U.S. PATENT DOCUMENTS

| | | |
|---|---|---|
| 7,391,732 B1 | 6/2008 | Cortez et al. |
| 7,619,979 B2 | 11/2009 | Phelan et al. |
| 7,664,986 B2 | 2/2010 | Angamuthu et al. |
| 7,779,306 B1 | 8/2010 | Philbin et al. |
| 8,407,527 B1 | 3/2013 | Philbin et al. |
| 9,760,419 B2 | 9/2017 | Zhou et al. |
| 9,819,575 B2 | 11/2017 | Gopalarathnam et al. |
| 2003/0237017 A1 | 12/2003 | Jibbe |
| 2008/0052433 A1 | 2/2008 | Harima et al. |
| 2008/0307273 A1 | 12/2008 | Nguyen et al. |
| 2009/0204743 A1 | 8/2009 | Inoue et al. |
| 2011/0173504 A1 | 7/2011 | Kabakura |
| 2013/0028070 A1 | 1/2013 | Beheshti-Zavareh et al. |
| 2013/0332768 A1 | 12/2013 | Koga et al. |
| 2017/0357542 A1 | 12/2017 | Zhou et al. |

FOREIGN PATENT DOCUMENTS

| | | |
|---|---|---|
| CN | 103617102 A | 3/2014 |
| CN | 103905219 A | 7/2014 |

OTHER PUBLICATIONS

Deng, Y., "RISC: A Resilient Interconnection Network for Scalable Cluster Storage Systems," Journal of Systems Architecture, vol. 54, No. 1-2, 2008, pp. 70-80. http://dsc.jnu.edu.cn/paper/2008/JSA200802.pdf.

Jing, W., "Research on Failure Detection and Data Migration Techniques in Intelligent Network Storage System," A dissertation submitted for the Degree of Master, South China University of Technology, Guangzhou, China, 66 pgs., 2012.

List of Patents or Patent Applications Treated as Related, Jun. 3, 2019, 2 pages.

Office Action Search Report, dated May 14, 2018, China Application No. 201410770650.4, filed Dec. 11, 2014, 2 pgs.

Office Action, dated May 25, 2018, China Application No. 201410770650.4, filed Dec. 11, 2014, 4 pgs., English translation.

METHOD AND APPARATUS FOR FAILURE DETECTION IN STORAGE SYSTEM

BACKGROUND

Embodiments of the present disclosure generally relate to a storage technology, and more specifically, relate to a method and an apparatus for failure detection in a storage system.

In some kind of storage systems, hardware storage devices such as disks and cabinets may be connected together by a plurality of switches so as to form a storage network. In such a storage network, data input/output (I/O) paths may involve a plurality of switches. It is known that when a software module in a storage system fails, a failure source may be relatively easily located through various software analysis and reproduction technologies.

Specifically, during running of a storage system, a switch may fail due to equipment aging, power supply issues (e.g., voltage instability), environment factor (e.g., temperature, humidity, etc.). In this case, a data I/O operation error in the storage system may be observed, for example, data format loss, check error, etc. In this case, a traditional solution needs to check all switches that likely cause the error in the I/O path one by one, which is time-consuming and troublesome.

Some known solutions perform failure detection using a checking technology. If check error occurs to data received by one switch in the I/O path, an upstream switch sending the data to the switch is determined as a failing device. However, this method has an accuracy deficiency. It would be appreciated that occurrence of a check error does not necessarily mean that the switch fails. In many cases, a check error might be caused by a software module, a link, or even some random or unknown reasons. Additionally, when a plurality of switches in the I/O path detects a check error of incoming data, the traditional method will decide that all of these switches are failing devices. However, this is often not the case.

SUMMARY

Generally, embodiments of the present invention provide a technical solution for failure detection in a storage system.

In one aspect, embodiments of the present invention provide a method for failure detection in a storage system, the method comprising: determining an amount of data received by a plurality of switches in the storage system within a predetermined time window so as to obtain a plurality of data amounts; determining a count of check errors detected by the plurality of switches in the data to obtain a plurality of check error counts; and calculating a failure risk for the plurality of switches based on the plurality of data amounts and the plurality of check error counts.

In another aspect, embodiments of the present invention provide an apparatus for failure detection in a storage system, the apparatus comprising: a data amount determining unit configured to determine an amount of data received by a plurality of switches in the storage system within a predetermined time window so as to obtain a plurality of data amounts; a check error counting unit configured to determine a count of check errors detected by the plurality of switches in the data to obtain a plurality of check error counts; and a risk calculating unit configured to calculate a failure risk for the plurality of switches based on the plurality of data amounts and the plurality of check error counts.

It would be appreciated that according to embodiments of the present invention, failure detection is not simply performed for an individual switch in a storage system. On the contrary, in the storage system, a plurality of to-be-checked switches and their association relationships in the storage system will be regarded as an organic whole, such that data transmission relationships between different switches will be taken into consideration. In this manner, a failing switch can be located more accurately. Other features and advantages of the present invention will become easily understood through the following description.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals are used to represent the same or similar elements.

DETAILED DESCRIPTION

Some embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
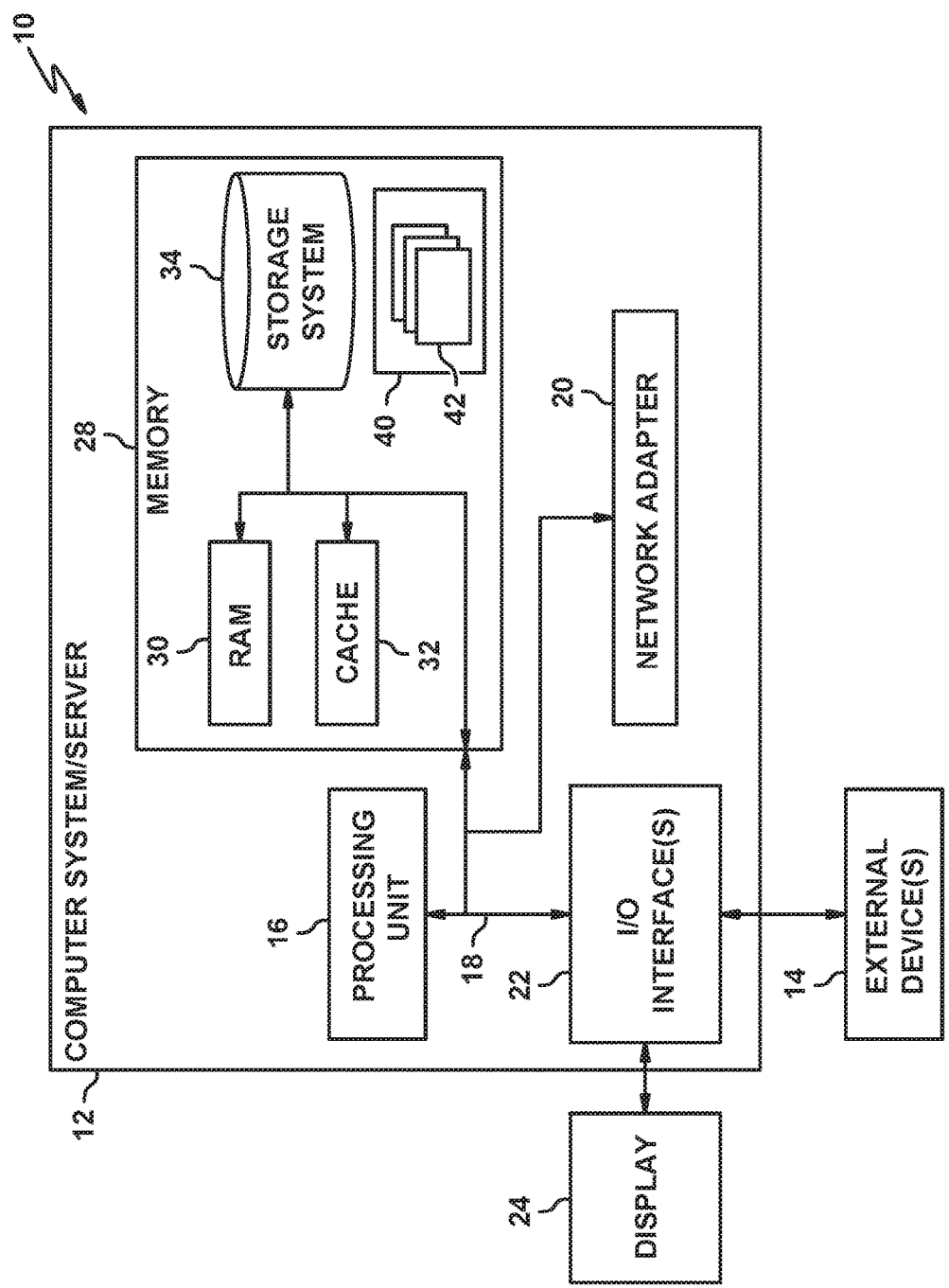
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description infra.

Figure 2:
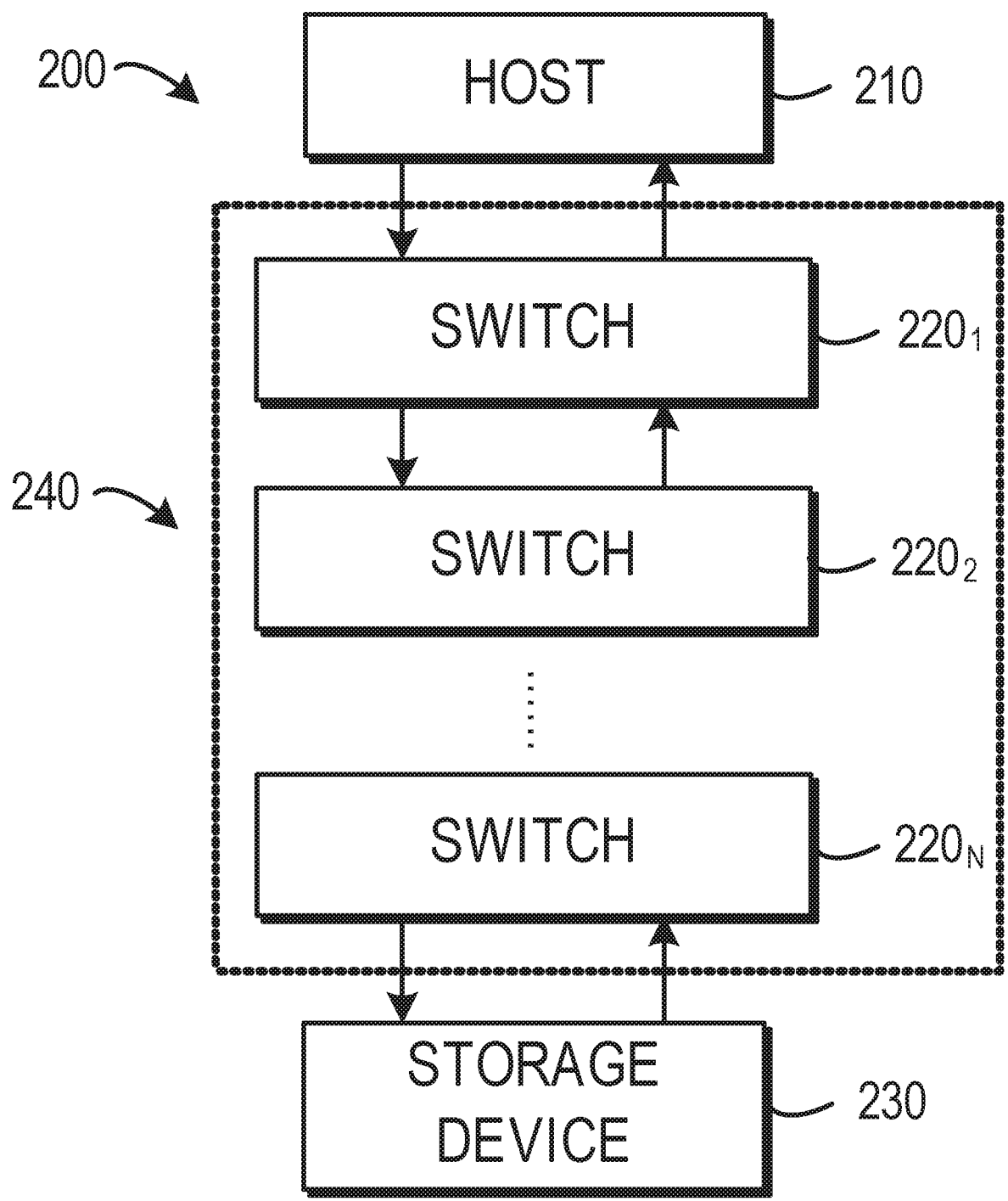
FIG. 2 shows a schematic block diagram of a storage system in which embodiments of the present invention may be implemented.

FIG. 2 shows a schematic block diagram of an exemplary storage system 200 in which embodiments of the present invention may be implemented. The storage system 200 comprises a host 210 which interacts with a user or an application so as to receive a data I/O request of the user or application. The host 210 also controls other devices in the storage 200 for performing the request.

The storage system 200 further comprises a plurality of switches $220_1$ . . . $220_N$ (generally referred to "switches 220"), wherein N is a natural number equal to or greater than 2. Each switch 220 is any appropriate device that can perform data reception and forwarding. In the storage system 200, switches 220 of the same or different kinds may be used.

Each switch can be connected to a storage device, such as a hard disk, a magnetic tape and a cabinet or the like, in order to write data into a storage device and read data from the storage device. Of course, some switches may also be only connected to other switches, without being directly connected to the storage device. In FIG. 2, a storage device 230 connected to a switch $220_N$ is illustrated. However, it should be understood that any other appropriate switch may be connected to its own storage device.

In the storage system 200, the I/O operation on data in a specific storage device may involve more than one switch. For example, in the example as shown in FIG. 2, when the host 210 wishes writing data into the storage device 230, the data to be written will be written into the storage device 230 in succession through switches $220_1$ . . . $220_N$. Similarly, when the host wishes reading data from the storage device 230, the read data are provided to the host 210 in succession through switches $220_N$ . . . $220_1$. These switches traversed by the data form an I/O path of the I/O operation. As an example, FIG. 2 shows an I/O path 240 between the host 210 and the storage device 230.

Figure 3:
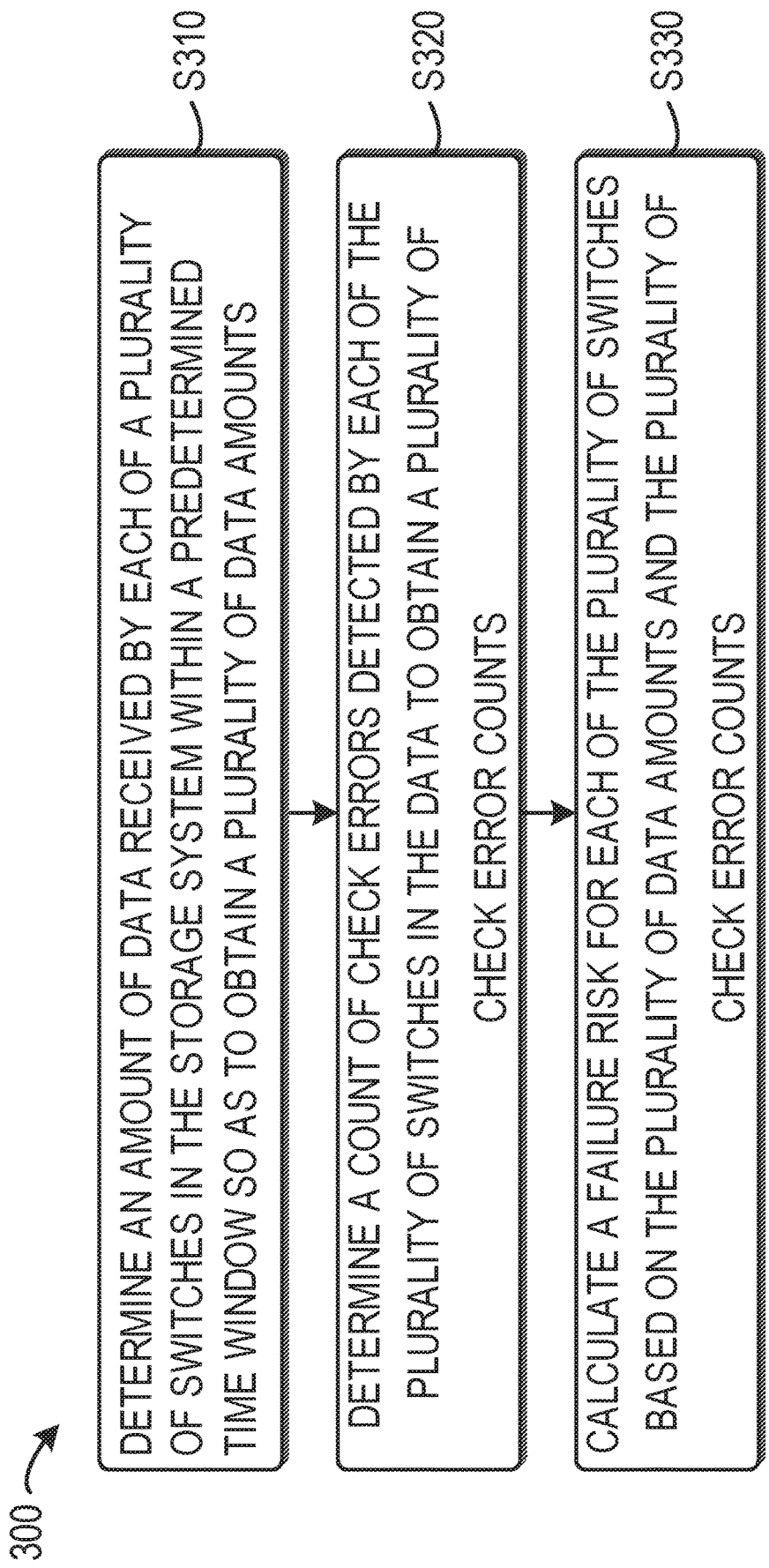
FIG. 3 shows a schematic flow diagram of a method for failure detection in a storage system according to an embodiment of the present invention.

As mentioned above, when the I/O path involves a plurality of switches, it is desirable for a method that can quickly and accurately locate a failing switch. FIG. 3 shows a schematic flow diagram of a method 300 for failure detection in a storage system according to embodiments of the present invention. According to embodiments of the present invention, failure detection is not simply based on a working state of a single switch. On the contrary, the switches in the entire storage system and the overall state of their connections are used for detecting a potential failure switch. By taking the connection relationships between switches into consideration, the failing switch can be located more accurately.

Specifically, as shown in FIG. 3, the method 300 starts from step S310, in which a data amount received by each of a plurality of switches in a storage system within a time window is determined.

In one embodiment, data is delivery in the storage system in a unit of frame. In such an embodiment, in step S310, a number of frames may be used to measure a data amount. Alternatively, the received data amount may be measured by byte number or any other appropriate measurement. The scope of the present invention is not limited in this aspect.

Please note that the "plurality of switches" here do not necessary mean all switches included in the storage system. In one embodiment, the switches considered in step S310 may be all switches in the I/O path with occurrence of error. Alternatively, in some other embodiments, some switches in the I/O path may be regarded as reliable. In this case, the switches considered in step S310 may be a part, not all, of the switches in the I/O path. At the ease of discussion, in the discussion below, the number of switches in consideration is described as N.

A length of the time window used in step S310 may be predetermined. For example, in one embodiment, when the host and/or storage device in the storage system find that the check error of the read and/or written data is relatively frequently, execution of the method 300 may be started. At this point, the time window may start timing.

Alternatively, in another embodiment, when the storage system is regarded as in an instable state due to relatively more data errors at a time (denoted as Ti), the time Ti may be used as a termination time of the time window. The start time of the time window may be a previous appropriate time $T_0$. For example, in one embodiment, the time $T_0$ may be any time when the storage system is in a stable state. In such an embodiment, at the time $T_0$, the received data amount of each switch in consideration may be reset to 0.

At the ease of discussion, in the description below, the host is regarded as a start point of the I/O path, and the storage device is regarded as a termination of the I/O path, without considering an actual data flow direction. Therefore, suppose in two switches in the I/O path, a first switch is closer to the host in distance than the second switch is, then the first switch is called an upstream switch of the second switch, while the second switch is called a downstream switch of the first switch.

According to embodiments of the present invention, in step S310, the switches in the I/O operation path are divided into three kinds so as to apply different processing. The switches of the first kind are called "top switches," which are directly connected to the host of the storage system. For example, in the example as shown in FIG. 2, the switch $220_1$ is a top switch in the I/O access path 240, which is directly connected to the host 210, without any other switch disposed therebetween.

For the top switch, the data amount determined in step S310 is the data amount received by the switch from a downstream switch connected thereto within the time window. For example, in the example of FIG. 2, the switch $220_2$ is a downstream of the top switch $220_1$. Therefore, in this example, in step S310, the data amount of the top switch $220_1$ from the switch $220_2$ in the time window may be determined. In other words, the data amount received by the top switch $220_1$ from the host 210 within the time window is ignored.

Figure 4:
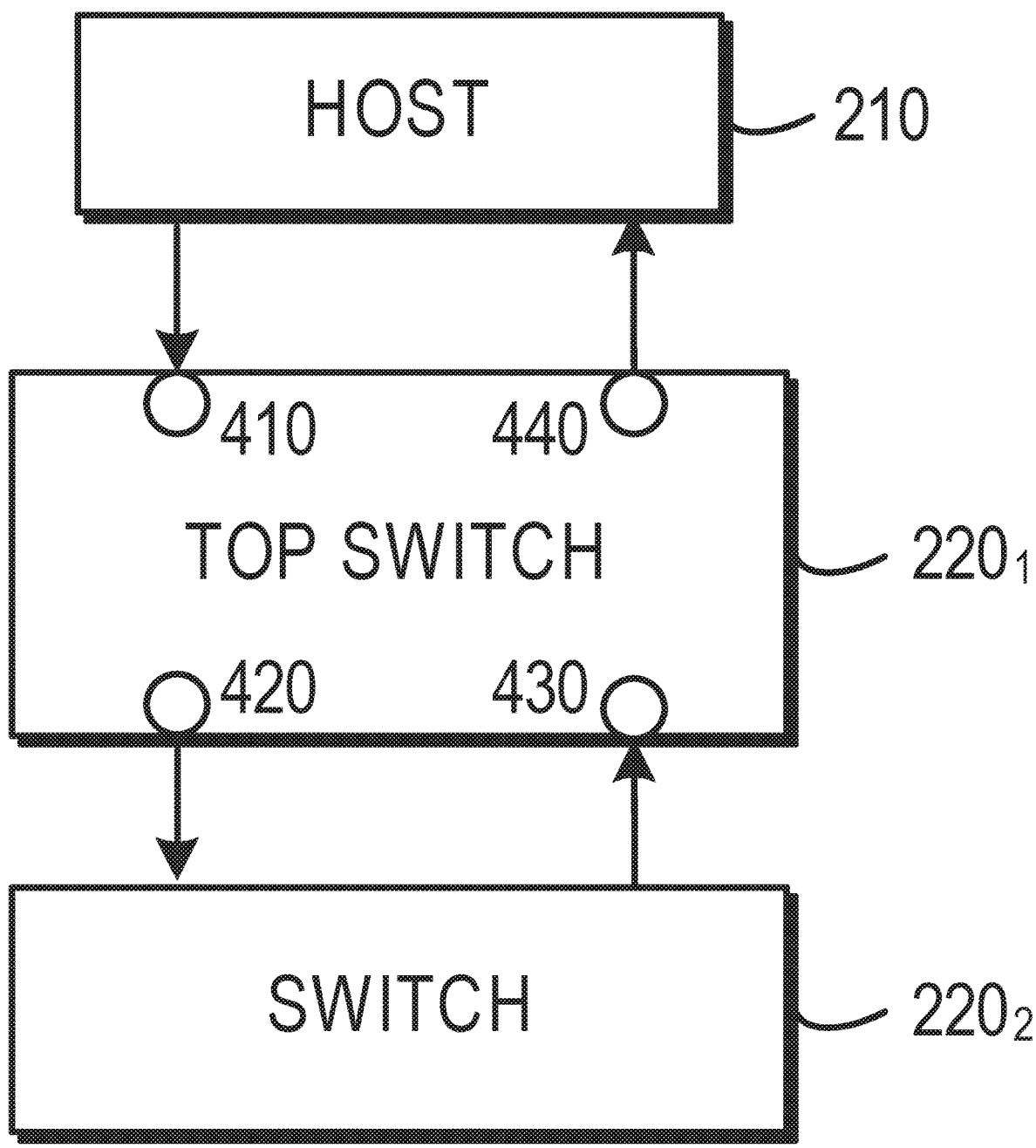
FIG. 4 shows a schematic block diagram of a data port of a top switch according to an embodiment of the present invention.

FIG. 4 shows a schematic block diagram of a data port of the top switch $220_1$. As shown in the figure, the top switch $220_1$ comprises four logical data ports 410, 420, 430, and 440. Note, the ports as shown in FIG. 4 are logically divided by functions. In implementation, one or more physical ports may be used to perform functions of these logical ports 410-440.

The port 410 is used to receive data to be written from the host 210, and the port 420 is used to pass the data to be written to a downstream switch $220_2$. The port 430 is used to receive the read data from the downstream switch $220_2$, and the port 440 is for delivering the read data to the host 210. In one embodiment, in step S310, for the top switch $220_1$, only the data amount from the downstream switch $220_2$ received from the port 430 within a given time window is considered, while the data from the host 210 received from the port 410 is ignored.

This would be beneficial. By excluding data from the host, when measuring the failure risk of each switch, it is allowed to only consider the data transmission path between the switches. This helps enhancement of the accuracy of failure detection.

The switches of the second kind are called bottom switches which are directly connected to the target storage device in the I/O path. For example, in the example as shown in FIG. 2, the switch $220_N$ is a bottom switch in the I/O access path 240, which is directly connected to the target storage device 230, without any other switch disposed therebetween.

For a bottom switch, the data determined in step S310 is the data received by the switch from an upstream switch connected thereto within the time window. For example, as shown in FIG. 2, the data amount received by the bottom switch $220_N$ within the time window is the data amount received by it from the upstream switch $220_{N-1}$ (not shown) within the time window. In other words, the data amount received by the bottom switch $220_N$ from the storage device 230 within the time window is ignored.

Figure 5:
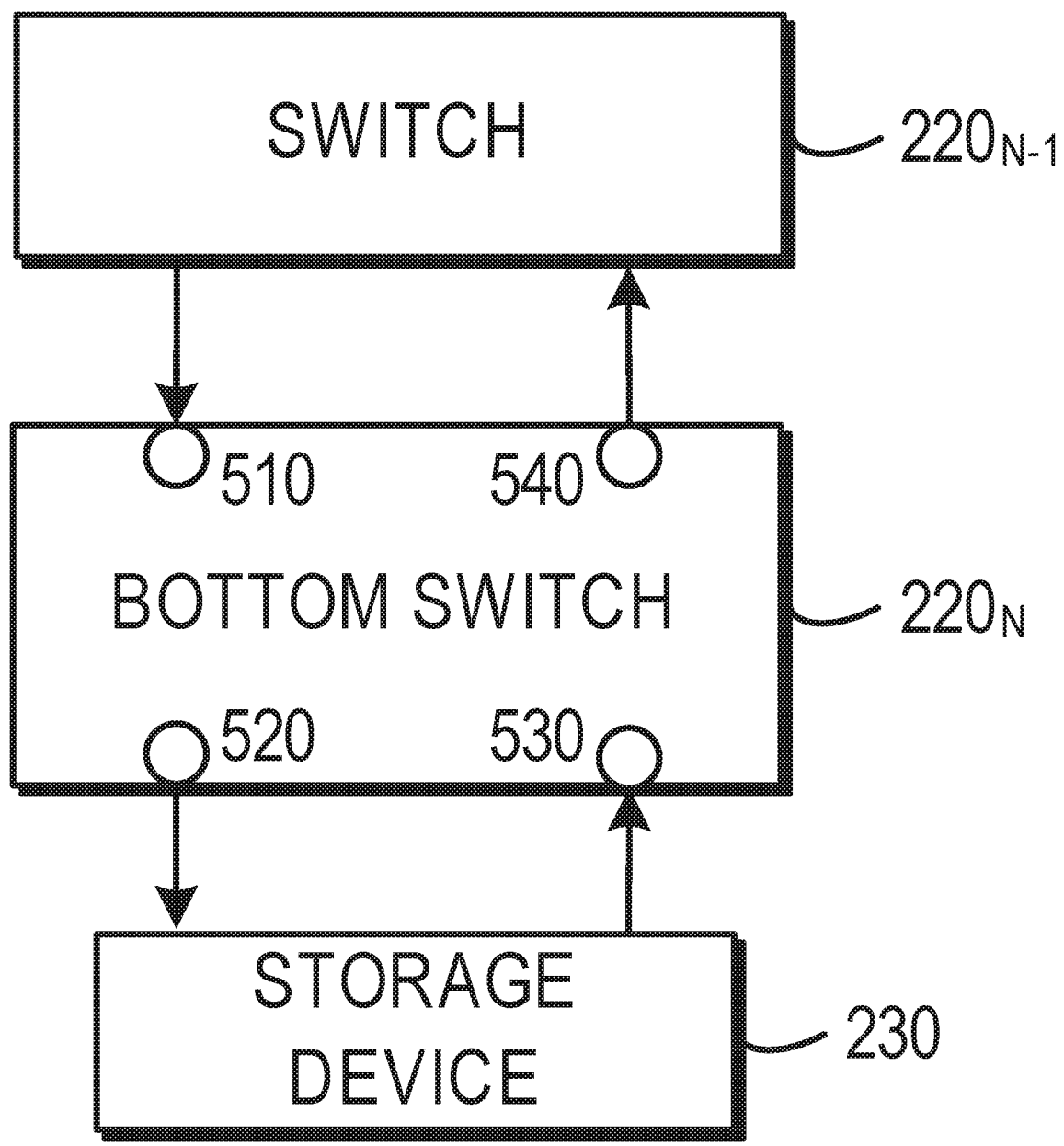
FIG. 5 shows a schematic block diagram of a data port of a bottom switch according to an embodiment of the present invention.

FIG. 5 shows a schematic block diagram of a data port of the top switch $220_N$. As shown in the figure, the bottom switch $220_N$ comprises four logical data ports 510, 520, 530, and 540. Similar to the example as described in FIG. 4, the ports as shown in FIG. 5 are all logically divided by functions. In implementation, one or more physical ports may be used to perform functions of these logical ports 510-540.

The port 510 is used to receive data to be written from an upstream switch $220_{N-1}$, and the port 520 is used to write the data to be written into the storage device 230. The port 530 is used to receive the read data from the storage device 230, while the port 540 is for delivering the read data to the upstream switch $220_{N-1}$. In one embodiment, at step S310, for the bottom switch 220N, only the data amount from the upstream 220N-1 received from the port 510 within a given time window is considered, while the data from the storage device 230 received from the port 530 is ignored.

Similar to the top switches, such configuration would be advantageous. By excluding the data from the storage device, when measuring the failure risk of each switch, only the data transmission path between the switches is considered. This helps enhancement of accuracy of failure detection.

The third kind of switches are intermediate switches which are connected to upstream switches and downstream switches in the I/O path, not directly connected to the host or storage device. For an intermediate storage device, the data determined in step S310 is the data received thereby from an upstream switch and a downstream switch.

Figure 6:
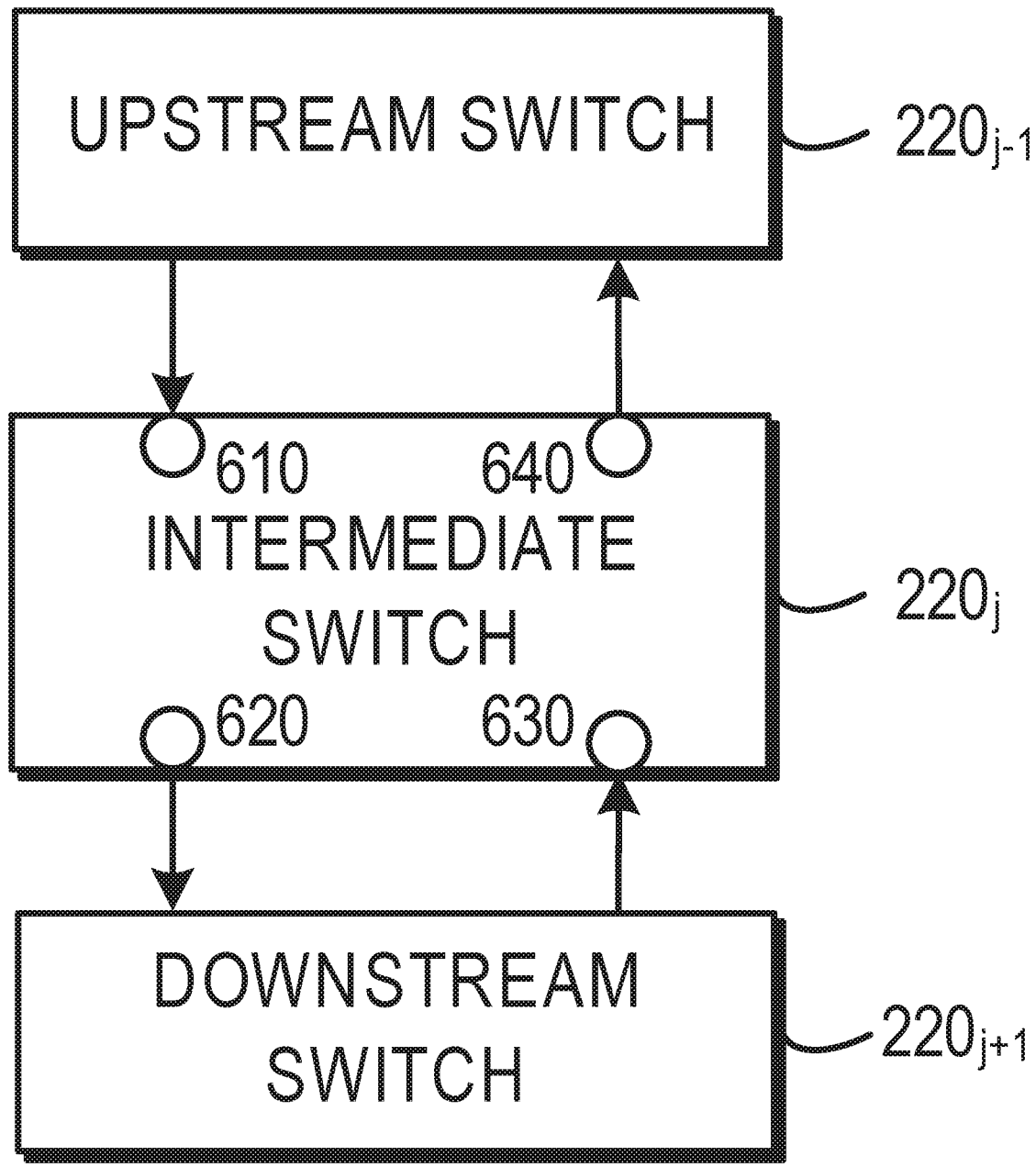
FIG. 6 shows a schematic block diagram of a data port of a middle-layer switch according to an embodiment of the present invention.

FIG. 6 shows a schematic block diagram of a data port of an intermediate switch $220_j$ (j=2 ... N-1). As shown in the figure, the intermediate switch $220_j$ includes four logical data ports 610, 620, 630, and 640. Similar to the examples as described with reference to FIGS. 4 and 5, the ports as shown in FIG. 6 are all logically divided by functions. During implementation, one or more physical ports may be used to perform functions of these logical ports 610-640.

The port 610 is used to receive data to be written from the upstream switch $220_{j-1}$, and the port 620 is for delivering the data to be written to the downstream switch $220_{j+1}$. The port 630 is used to receive the read data from the downstream $220j+1$, while the port 640 is for delivering the read data from the upstream switch $220_{j-1}$. According to embodiments of the present invention, for the intermediate switch 220i, the data amount from the upstream switch $220_{j-1}$ received from the port 610 and the data amount from the downstream switch $220_{j+1}$ received from the port 630 within a given time window are considered.

Through perform step S310, the data amount received by each switch $S_i$ (i=1, ..., N) within a time window may be determined. At the ease of discussion, the data amount is divided into data amount $W_i$ of upstream data (i.e., write data) and data amount $R_i$ of downstream data (i.e., read data). As mentioned above, in one embodiment, the data amount $W_1$ of upstream data of the top switch=0. Alternatively or additionally, in one embodiment, the data amount RN of downstream data of the bottom switch=0. In this way, a set {(W1, R1), (W2, R2) ... (WN, RN)} of measurement values of data amounts are obtained.

Still in reference to FIG. 3. Next, the method 300 proceeds to step S320. In step S320, a count of check errors detected in the received data for each of the plurality of switches in consideration within the time window is determined.

According to embodiments of the present invention, each time when a switch receives a certain amount of data, it will check the received data. For example, check may be performed with a unit of frame. However, it is not necessary. In an alternative embodiment, check may also be performed for any data of a designated size. In particular, at the start time $T_0$ of the time window, the count of check errors of each switch in consideration may be reset to 0.

Any currently known or future developed data check technology may be used in combination with embodiments of the present invention. For example, in one embodiment, the switch may use a cyclic redundancy check (CRC) or any of its transformation to check the received data. Alternatively or additionally, the switch may perform parity check, sum check, MD5 check, and/or any appropriate check process to the received data. The scope of the present invention is not limited in this aspect.

In one embodiment, a check error counter associated with each switch may be maintained. Each time when a switch finds a check error in the received data, a value of the associated counter will be incremental by 1. In this way, a count of check errors detected by each switch in the received data within the time window may be obtained.

As mentioned above, in one embodiment, when determining the received data amount in step S310, the top switch may ignore the data amount from the host. Similarly, in one embodiment, in step S320, the top switch may not count the check errors of the data from the host. In other words, when the top switch finds a check error in the data received from the host, the check error will be ignored without incrementing the value of the counter.

Similarly, as mentioned above, in one embodiment, when determining the received data amount at step S310, the bottom switch may ignore the data amount from the storage device. Similarly, in one embodiment, in step S320, the bottom switch may not count the check errors of the data from the storage device. In other words, when the bottom switch finds a check error in the data received from the storage device, the check error will be ignored without incrementing the value of the counter.

In particular, in one embodiment, if a switch detects a check error in data received from a neighboring device, it may request the neighboring device to retransmit data to the switch. The "neighboring device" here may include a switch, and may also include a host or a storage device. The neighboring device may be an upstream device or a downstream device.

As an example, suppose the data is transmitted in the storage system with a unit of frame. Suppose one intermediate switch receives a data frame from a neighboring switch (an upstream switch or a downstream switch), and check to the data frame (e.g., CRC check) fails. In this case, the intermediate switch may transmit a request to the neighboring switch, such that the neighboring switch re-transmits the data frame to the intermediate switch. The retransmission process may be performed once or for multiple times, till no error occurs to the check to the received data frame, or till expiration of a predetermined repeated period.

Such practice is advantageous. In this way, unnecessary expansion of error data may be avoided. Suppose the first switch receives data from an upstream second switch, and check error is found in the data. Such error may be caused by some accidental factors, unknown reasons, and/or link conditions. By virtue of retransmission of the second switch, interference of these factors may be excluded to the utmost extend during the process of identifying the failing switch. Of course, such practice is not a must. In an alternative embodiment, when check error of data is found, the data may be directly forwarded without a need of retransmission.

In particular, as mentioned above, when the top switch determines the received data amount (step S310) and check error count (step S320), data from the host may be ignored. However, in practice, the top switch may likewise find a check error from among the data from the host. This, for example, may be caused by the link between the host and the top switch or by other reasons. In this case, in one embodiment, the top switch may request the host to retransmit data, till no check error will occur.

Similarly, when the bottom switch determines the received data amount (step S310) and check error count (step S320), data from the storage device may be ignored. However, in practice, the bottom switch may likewise find the check error from among the stored data. This, for example, is caused by the link between the bottom switch and the storage device or by other factors. In this case, in one embodiment, the bottom switch may request the storage device to retransmit data, till no check error will occur.

By performing step S320, a plurality of check error counts {Ei}, i=1 ... N associated with a plurality of switches may be obtained, respectively. Next, the method 300 proceeds to step S330, where based on the plurality of data amounts {($W_i$, $R_i$)} determined in step S310 and a plurality of check error counts {$E_i$} obtained in step S320, risk of occurrence of failure for each of the plurality of switches is calculated.

As described above, different from considering each switch individually, according to embodiments of the present invention, a plurality of switches in the I/O path are regarded as an organic whole, thereby determining, in mutual association, failure risks for a plurality of switches.

Specifically, in one embodiment, a "health state" is defined for each switch. The health state indicates a risk of occurrence of failure for the switch. The higher the value of the health state of a switch is, the lower the risk of its occurrence of failure is; otherwise, a lower the value of the health state of a switch is, the higher the risk of its occurrence of failure is. For example, in one embodiment, the failure risk and the health state may be reciprocal to each other. In the description infra, the failure risk and the health condition may be used in exchange.

In one embodiment, for each switch i (i=1 N) in a plurality of switches, a count E of check errors checked by the switch i within a time window may be characterized using the following items:

$$E_i = W_i * H_{i-1} + R_i * H_{i+1} \quad (1)$$

where $W_i$ denotes the amount of write data received by the switch i from an upstream device (switch or host) connected thereto within a time window T; $H_{i-1}$ denotes a health state of the upstream device; Rj denotes an amount of read data received by the switch i from a downstream device (a switch or a storage device) connected thereto within a time window T; $H_{i+1}$ denotes a health state of the downstream device.

In particular, for the top switch (i=1), $H_{i-1}$ (namely, H0) may represent the health state of the host. In one embodiment, it may be regarded that the failure risk for a host is relatively low. Correspondingly $H_0$ may be defined to be a value large enough. Alternatively, in one embodiment, as mentioned above, the top switch may ignore the data received from the host within a time window, namely, $W_1=0$. In this case, $H_0$ may be defined as a random value.

Similarly, for the bottom switch (i=N), $H_{i+1}$ (namely, $H_{N+1}$) may indicate the health state of the storage device. In one embodiment, it may be regarded that the risk for occurrence of failure to the storage device is relatively low. Correspondingly, $H_{N+1}$ may be defined as a value large enough. Alternatively, in one embodiment, as mentioned above, the bottom switch may ignore the data received from the storage device within a time window, namely, $R_N=0$. In this case, $H_{N+1}$ may be defined as a random value.

It should be understood that characterization of the check error count E as shown in equation (1) is not restrictive. Based on the actual application and needs, those skilled in the art may contemplate any appropriate transformation. For example, in one embodiment, some switches in the I/O path may have difference importance. For another example, based on factors such as device types, manufacturers, use time of switches, different switches may have different risk levels. In this case, sum in equation (1) may be changed to weighted sum:

$$E_i = \alpha * W_i * H_{i-1} + \beta * R_i * H_{i+1}$$

where $\alpha$ denotes a weight of an upstream switch, $\beta$ denotes a weight of a downstream switch. In one embodiment, $\alpha$ and/or $\beta$ may be determined based on one or more relevant factors such as a device type, a manufacturer, use time, importance, historical failure situation, and the like of the corresponding switch. In this way, a switch that is relatively important and/or a switch with a relatively high risk level may be given a special attention. Any other appropriate transformations are possible, and the scope of the present invention is not limited in this aspect.

In this way, N characterizations of the check error count may be obtained, and each characterization may be regarded as an equation. In this way, a N-variable equation set including N equations and N unknown numbers (i.e., $H_1 \ldots H_N$) is obtained. Through resolving this equation set, the health state (i.e., failure risk) of N switches may be determined once for all based on the characterizations of the check error count. The failure risk estimated in such way considers the connection relationship between different switches and the transmission path of data between the switches. Compared with a traditional solution separately considering the individual switches, the accuracy of identifying a failing switch may be enhanced significantly.

In one embodiment, a plurality of switches may be ordered in a descending order of the failure risk (or the ascending order of the health state). One or more switches ranking top may be identified as failing switches. Alternatively or additionally, the failure risk (or health state) of each switch may be compared with a predetermined threshold. If the failure risk of one switch exceeds a predetermined threshold or the health state is lower than a predetermined threshold, the switch is identified as a failing switch.

In one embodiment, the identified failing switch may be repaired automatically and/or manually. For example, a failing switch or some components thereof may be restarted, or the failing switch or some components thereof may be changed, etc. Then, it may be regarded that the storage system re-enters into a steady state. Accordingly, in one embodiment, the received data amount and the check error count of each switch may be reset to 0. Then, in one embodiment, the received data amount and check error count of each switch may be re-determined automatically, so as to perform subsequent failure detection.

Figure 7:
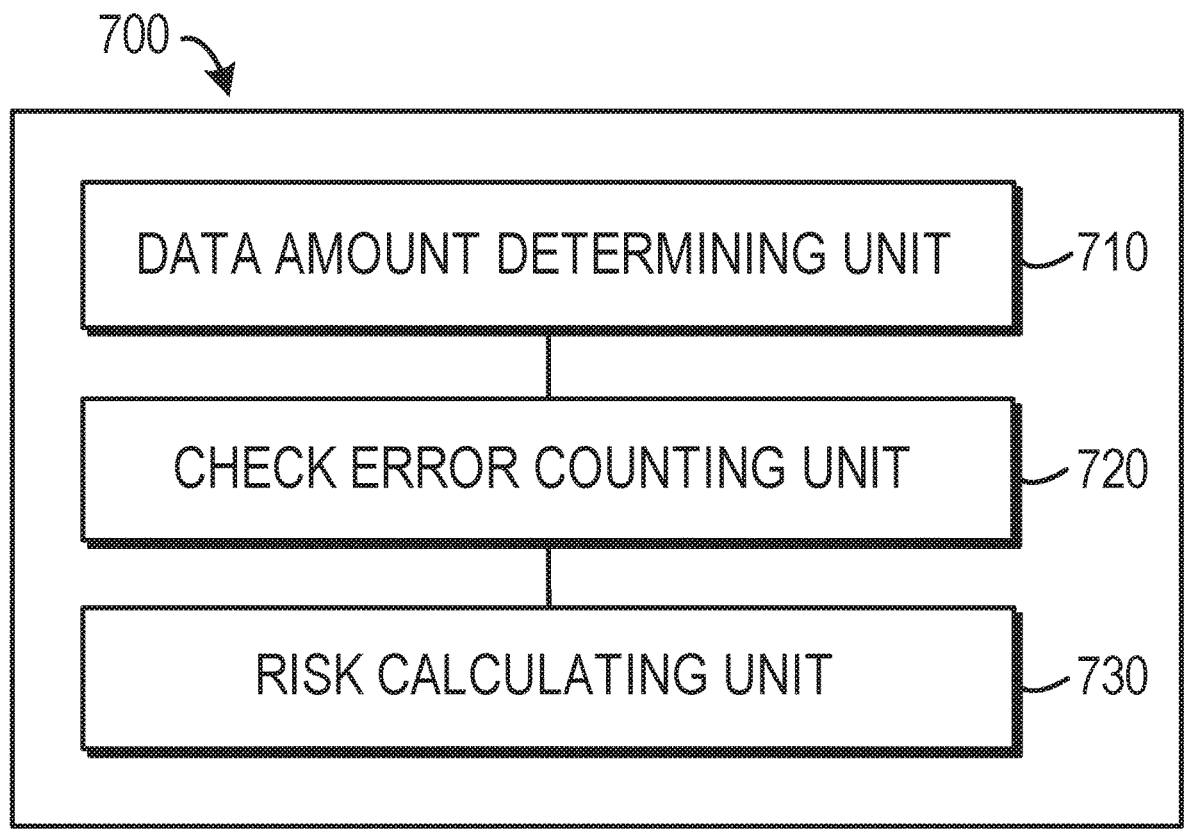
FIG. 7 shows a schematic block diagram of an apparatus for failure detection in a storage system according to an embodiment of the present invention.

FIG. 7 shows a schematic block diagram of an apparatus 700 for failure detection in a storage system according to an embodiment of the present invention. As shown in the figure, the apparatus 700 comprises: a data amount determining unit 710 configured to determine an amount of data received by each of a plurality of switches in the storage system within a predetermined time window so as to obtain a plurality of data amounts; a check error counting unit 720 configured to determine a count of check errors detected by each of the plurality of switches in the data to obtain a plurality of check error counts; and a risk calculating unit 730 configured to calculate a failure risk for each of the plurality of switches based on the plurality of data amounts and the plurality of check error counts.

In one embodiment, the data amount determining unit 710 may comprise a top data amount determining unit configured to, for a top switch among the plurality of switches that is connected to a host of the storage system, ignore an amount of data received from the host within the time window. Additionally or alternatively, in one embodiment, the check error counting unit 720 may comprise a top counting unit configured to, for a top switch among the plurality of switches that is connected to a host of the storage system, ignore a check error detected in data received from the host within the time window.

In one embodiment, the data amount determining unit 710 may comprise a bottom data amount determining unit configured to, for a bottom switch among the plurality of switches that is connected to a storage device of the storage system, ignore an amount of data received from the storage device within the time window. Additionally or alternatively, in one embodiment, the check error counting unit 720 may comprise a bottom counting unit configured to, for a bottom switch among the plurality of switches that is connected to a storage device of the storage system, ignore a check error detected in data received from the storage device within the time window.

In one embodiment, the data amount determining unit 710 may comprise: an upstream data amount determining unit configured to determine, for an intermediate switch among the plurality of switches, an amount of write data received from an upstream switch connected to the intermediate switch within the time window; and a downstream data amount determining unit configured to determine, for an intermediate switch among the plurality of switches, an amount of read data received from a downstream switch connected to the intermediate switch within the time window.

In one embodiment, the apparatus 700 further comprises a retransmission request unit configured to in response to a given switch of the plurality of switches detecting a check error in data received from a neighboring device connected to the given switch, request the neighboring device to retransmit the data to the given switch.

In one embodiment, the risk calculating unit 730 may comprise a count characterization obtaining unit configured to, for each of the plurality of switches, characterize the count of check errors with the following items to obtain a plurality of count characterizations: the risk for failure occurring to upstream device, amount of write data received from the upstream device, the risk for failure occurring to the downstream, and amount of read data received from the downstream device. The count characterization is used for calculating the failure risk of each of the plurality of switches.

In one embodiment, a count of the check error of each switch is characterized as a sum of the following two items: a product of the failure risk for the upstream device and the amount of write data received from the upstream device; and a product of the failure risk for the downstream device and the amount of read data received from the downstream device. In one embodiment, a weighted sum may be used. A weight for at least one of the upstream device and the downstream device is determined based on at least one of the following: a device type, a manufacturer, use time, importance, and historical failures.

In one embodiment, the apparatus 700 may further comprise: a risk ordering unit configured to order the plurality of switches in a descending order of the failure risks; and a failure identifying unit configured to identify at least one switch ranking top as a failing switch.

It should be noted that for the sake of clarity, FIG. 7 does not show optional units or sub-units included in the apparatus 700. All features and operations as described above are suitable for apparatus 700, respectively, which are therefore not detailed here. Moreover, partitioning of units or subunits in apparatus 700 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatus 700 may be implemented by various manners, including software, hardware, firmware or a random combination thereof. For example, in some embodiments, the apparatus may be implemented by software and/or firmware. Alternatively or additionally, the apparatus 700 may be implemented partially or completely based on hardware. for example, one or more units in the apparatus 700 may be implemented as an integrated circuit (IC) chip, an application-specific integrated circuit (ASIC), a system on chip (SOC), a field programmable gate array (FPGA), and the like. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving failure detection in a storage system, the method comprising:
    determining, by one or more processors of a computing system, a data amount received by a switch in the storage system;
    requesting, in response to the switch detecting a check error in data received from a neighboring device connected to the switch, the neighboring device to retransmit the data to the switch;
    determining, by the one or more processors of the computing system, a count of check errors detected in the data amount by the switch; and
    calculating, by the one or more processors of the computing system, a failure risk for the switch and the neighboring device based on the data amount and the count of check errors.

2. The method according to claim 1, wherein the switch is a top switch, the top switch being directly connected to a host of the storage system.

3. The method according to claim 2, wherein determining the count of check errors detected in the data amount by the switch includes:
    ignoring, by the switch, a check error detected in data received from the host within a time window.

4. The method according to claim 1, wherein the switch is a bottom switch, wherein the switch is connected to a storage device of the storage system, and wherein determining the data amount received by the switch in the storage system includes:
    ignoring, by the switch, an amount of data received from the storage device within a time window.

5. The method according to claim 1, wherein the switch is a bottom switch, wherein the switch is connected to a storage device of the storage system, and wherein determining the count of check errors detected in the data amount by the switch includes:
    ignoring, by the switch, a check error detected in data received from the storage device within a time window.

6. The method according to claim 1, wherein the switch is an intermediate switch, and wherein determining the data amount received by the switch in the storage system comprises:
    determining an amount of write data received from an upstream switch connected to the switch within a time window; and
    determining an amount of read data received from a downstream switch connected to the switch within the time window.

7. The method according to claim 1, wherein the data amount received by the switch in the storage system is received within a predetermined time window.

8. The method according to claim 1, wherein calculating the failure risk for the switch and the neighboring device comprises:
    characterizing the count of check errors as a plurality of count characterizations including:
    a failure risk for an upstream device,
    an amount of write data received from the upstream device,
    a failure risk for a downstream device, and
    an amount of read data received from the downstream device; and
    calculating the failure risk for the switch based on the count characterization.

9. The method according to claim 8, wherein a sum of the count of check errors of the switch is characterized by:

calculating a product of the failure risk for the upstream device and the amount of write data received from the upstream device; and calculating a product of the failure risk for the downstream device and the amount of read data received from the downstream device.

10. The method according to claim 9, wherein the sum of the count check errors is a weighted sum, and wherein a weight for at least one of the upstream device and the downstream device is determined based on at least one of the following: a device type, a manufacturer, use time, importance, and historical failures.

11. A storage apparatus for improving failure detection in a storage system, the storage system including a plurality of storage devices that are interconnected via a storage network, the storage system including one or more host devices, the storage apparatus comprising:

a memory; and a processor, wherein the processor is configured to perform operations comprising:

determining, by one or more processors of a computing system, a data amount received by a switch in the storage system;

requesting, in response to the switch detecting a check error in data received from a neighboring device connected to the switch, the neighboring device to retransmit the data to the switch;

determining, by the one or more processors of the computing system, a count of check errors detected in the data amount by the switch; and calculating, by the one or more processors of the computing system, a failure risk for the switch and the neighboring device based on the data amount and the count of check errors.

12. The storage apparatus according to claim 11, wherein the switch is a top switch, wherein the switch is connected to a storage device of the storage system, and wherein determining the data amount received by the switch in the storage system includes:

ignoring, by the switch, an amount of data received from the storage device within a time window.

13. The storage apparatus according to claim 11, wherein the switch is a top switch, wherein the switch is connected to a storage device of the storage system, and wherein determining the count of check errors detected in the data amount by the switch includes:

ignoring, by the switch, a check error detected in data received from the storage device within a time window.

14. The storage apparatus according to claim 11, wherein the switch is a bottom switch, wherein the switch is connected to a storage device of the storage system, and wherein determining the data amount received by the switch in the storage system includes:

ignoring, by the switch, an amount of data received from the storage device within a time window.

15. The storage apparatus according to claim 11, wherein the switch is a bottom switch, wherein the switch is connected to a storage device of the storage system, and wherein determining the count of check errors detected in the data amount by the switch includes:

ignoring, by the switch, a check error detected in data received from the storage device within a time window.

16. The storage apparatus according to claim 11, wherein the switch is an intermediate switch, and wherein determining the data amount received by the switch in the storage system comprises:

determining an amount of write data received from an upstream switch connected to the switch within a time window; and determining an amount of read data received from a downstream switch connected to the switch within the time window.

17. The storage apparatus according to claim 11, wherein the data amount received by the switch in the storage system is received within a predetermined time window.

18. The storage apparatus according to claim 11, wherein calculating the failure risk for the switch and the neighboring device comprises:

characterizing the count of check errors as a plurality of count characterizations including:

a failure risk for an upstream device, an amount of write data received from the upstream device, a failure risk for a downstream device, and an amount of read data received from the downstream device; and calculating the failure risk for the switch based on the count characterization.

19. The storage apparatus according to claim 18, wherein a sum of the count of check errors of the switch is characterized by:

calculating a product of the failure risk for the upstream device and the amount of write data received from the upstream device; and calculating a product of the failure risk for the downstream device and the amount of read data received from the downstream device.

20. The storage apparatus according to claim 19, wherein the sum of the count check errors is a weighted sum, and wherein a weight for at least one of the upstream device and the downstream device is determined based on at least one of the following: a device type, a manufacturer, use time, importance, and historical failures.

* * * * *